United States Patent
Okada et al.

(10) Patent No.: US 8,015,847 B2
(45) Date of Patent: Sep. 13, 2011

(54) OPTICAL FIBER MANUFACTURING, COOLING AND COATING METHOD

(75) Inventors: Kenji Okada, Sakura (JP); Shingo Matsushita, Sakura (JP)

(73) Assignee: Fujikura Ltd., Tokyo (JP)

( * ) Notice: Subject to any disclaimer, the term of this patent is extended or adjusted under 35 U.S.C. 154(b) by 237 days.

(21) Appl. No.: 12/432,115

(22) Filed: Apr. 29, 2009

(65) Prior Publication Data

US 2010/0107701 A1    May 6, 2010

(30) Foreign Application Priority Data

Nov. 5, 2008   (JP) .................................. 2008-284156

(51) Int. Cl.
*C03B 37/023*    (2006.01)
(52) U.S. Cl. ................................ 65/424; 65/432; 65/434
(58) Field of Classification Search .................... 65/379, 65/434, 432, 424
See application file for complete search history.

(56) References Cited

U.S. PATENT DOCUMENTS

2003/0148025 A1    8/2003   Azegami et al.

FOREIGN PATENT DOCUMENTS

| JP | 2003-95689 A | 4/2003 |
| JP | 2003-146688 A | 5/2003 |
| JP | 2004-142976 A | 5/2004 |
| JP | 2005119901 A | 5/2005 |
| SU | 971087 A3 | 10/1982 |
| SU | 1033457 A | 8/1983 |
| SU | 1723059 A | 3/1992 |

*Primary Examiner* — John Hoffmann
(74) *Attorney, Agent, or Firm* — Sughrue Mion, PLLC

(57) ABSTRACT

An optical fiber apparatus and manufacturing method thereof includes: forming a bare optical fiber by melting and deforming an optical fiber preform; cooling the bare optical fiber after the bare optical fiber forming step by passing it through a flow channel of a cooling unit through which cooling gas flows; and forming a protective coating layer by supplying a molten resin to a periphery of the bare optical fiber after the cooling step thereby forming an optical fiber. The cooling gas flowing toward a vertically lower end of the flow channel is blocked by the molten resin used to form the protective coating layer, and carbon dioxide gas is supplied toward the flow channel from a position which is vertically below the supply position of the cooling gas and vertically above the blocking position of the molten resin.

8 Claims, 5 Drawing Sheets

OPTICAL FIBER MANUFACTURING, COOLING AND COATING METHOD

Priority is claimed from Japanese Patent Application No. 2008-284156, filed on Nov. 5, 2008, the content of which is incorporated herein by reference.

BACKGROUND OF THE INVENTION

1. Field of the Invention

Exemplary embodiments of the present invention relate to an optical fiber manufacturing method and an optical fiber manufacturing apparatus for drawing an optical fiber from an optical fiber preform, thereby manufacturing the optical fiber.

2. Description of the Related Art

FIG. 5 is a schematic view illustrating a configuration of a conventional optical fiber manufacturing apparatus. In general, an optical fiber is manufactured by the following operations.

(1) An optical fiber preform 101 that is a glass rod used as a basis for an optical fiber is inserted into a heating furnace 102. The front end of the optical fiber preform 101 is heated and melted by a heater 102a of the heating furnace 102 at a temperature of about 2000° C. to form a bare optical fiber 103. The bare optical fiber 103 is pulled from the lower portion of the heating furnace 102.

(2) Below the heating furnace 102, a cooling unit 104 that extends longitudinally in a vertical direction is provided. Inside the cooling tube 104A, a cooling gas such as helium gas is supplied from a side portion 104a of the cooling tube 104A at the longitudinal center position. As shown by a flow direction 110 in FIG. 5, the cooling gas is supplied into the cooling tube 104A at the center position and then spreads upwards and downwards. The bare optical fiber 103 pulled out of the heating furnace 102 is cooled by the cooling gas to a temperature at which it can be coated.

(3) In order to form a protective coating layer for protecting the surface of the bare optical fiber 103, first, the cooled bare optical fiber 103 is passed through a coating unit 106. The coating unit 106 applies a coating resin (not shown) to the surface of the bare optical fiber 103. Thereafter, the bare optical fiber 103 is passed through a curing unit 108 so that the coating resin is subjected to thermal curing or UV curing, thereby forming an optical fiber 107. The protective coating layer (not shown) formed of the coating resin as described above generally has a two-layer structure that includes an inner layer, made of a material with a relatively low Young's modulus, and an outer layer made of a material with a relatively higher Young's modulus.

(4) After the optical fiber 107 is passed through the curing unit 108, the optical fiber 107 is fed out through a turn pulley 109 to be wound by a winder (not shown).

In order to increase productivity for optical fibers in an optical fiber manufacturing method, an increase in the size of the optical fiber preform and an increase in drawing speed have been desired. In order to increase the drawing speed without raising a fiber drawing tower (not shown), which receives the optical fiber manufacturing apparatus therein, a development to increase the cooling efficiency with the cooling unit 104 used in the cooling operation of the bare optical fiber 103 described above in (2) has been made. Here, the cooling unit 104 generally uses helium gas having high thermal conductivity as the cooling gas. However, since helium gas is expensive, a development to reduce the amount of helium gas and increase the cooling efficiency has been made.

An example of a cooling method that reduces the amount of helium gas while maintaining an acceptable cooling efficiency is disclosed in the Japanese Unexamined Patent Application, First Publication No. 2003-95689. FIG. 6 is a schematic view illustrating a configuration of an optical fiber manufacturing apparatus disclosed in Japanese Unexamined Patent Application, First Publication No. 2003-95689 (in the figure, the same elements as described with reference to FIG. 5 are denoted by the same reference numerals, and a detailed description thereof is omitted).

The optical fiber manufacturing apparatus is provided with a mechanism for supplying sealing gas which prevents cooling gas such as helium gas from being diluted with air. A helium gas inlet port 204a is provided at a vertically low portion (that is, on the output side of the bare optical fiber 103) of the cooling tube 204A of the cooling unit 204. In addition, a sealing gas inlet port 204b is provided vertically below the helium gas inlet port 204a. With such a configuration, the cooling gas supplied through the helium gas inlet port 204a is discharged from the vertically upper portion (that is, on the input side of the bare optical fiber 103) of the cooling tube 204A as shown by a flow direction 210 in FIG. 6. In addition, the sealing gas such as carbon dioxide gas ($CO_2$) supplied through the sealing gas inlet port 204b flows toward the vertically lower portion of the cooling tube 204A as shown by a flow direction 211. Accordingly, the sealing gas is introduced from the sealing gas inlet port 204b disposed vertically below the helium gas inlet port 204a to cause the flow direction 211 of the sealing gas, thereby preventing the cooling gas from flowing out from the lower portion of the cooling tube 204A. Moreover, since the carbon dioxide gas is employed as the sealing gas, a dilution of the cooling gas (particularly the helium gas) lighter than air, with the sealing gas can be prevented. Accordingly, a decrease in cooling efficiency can be avoided, and the amount of the cooling gas can be reduced by 10 to 20% as compared with a conventional case.

As described above, in the apparatus disclosed in Japanese Unexamined Patent Application, First Publication No. 2003-95689, the helium gas inlet port 204a is provided at the lower portion of the cooling tube 204A, and the sealing gas inlet port 204b is additionally provided below the helium gas inlet port 204a. Accordingly, it is designed so that the cooling gas flows upwards and the sealing gas flows downwards.

However, the practical flows of the cooling gas and the sealing gas are pulled by the movement of the bare optical fiber 103 or influenced by viscous resistance or the like that occurs when the gases flow inside the cooling tube 204A. For example, in some cases, due to the increase of a drawing speed from the start of the drawing until a product manufacturing condition, the change in the drawing speed during the drawing, and the like, the flows of the cooling gas and the sealing gas are not as desired. In this case, the cooling gas may be discharged from the lower portion of the cooling tube 204A, the flow of the cooling gas may become unstable, or the cooling gas may be mixed with the sealing gas to cause an unstable mixing ratio, thereby resulting in unstable cooling efficiency. Accordingly, there is a problem in that the apparatus disclosed in Japanese Unexamined Patent Application, First Publication No. 2003-95689 has poor manufacturing stability and reproducibility.

Meanwhile, the thickness of the protective coating layer varies depending on the temperature of the cooled bare optical fiber 103. Therefore, in order to maintain the thickness (coating diameter) of the protective coating layer at a constant level over the entire length of the optical fiber 107, generally, the cooling ability of the cooling unit 204 is adjusted according to the change in the drawing speed.

The apparatus disclosed in Japanese Unexamined Patent Application, First Publication No. 2003-95689 is provided with a mechanism for supplying cooling ability-adjusting gas to be mixed with the cooling gas. However, there is a concern that, in the apparatus, the cooling ability-adjusting gas and the sealing gas are mixed with each other, thereby resulting in a further unstable mixing ratio. In this case, problems such as degradation in response characteristics upon adjusting the cooling ability and in an adjustment of the cooling ability occur.

Exemplary embodiments of the present invention were devised in view of the above circumstances, and have an exemplary objective of providing an optical fiber manufacturing apparatus and an optical fiber manufacturing method which can reduce the amount of cooling gas and control a cooling ability with good response characteristics.

SUMMARY OF THE INVENTION

To solve the above-mentioned problems, the exemplary embodiments of the present employ the followings elements:

(1) An exemplary optical fiber manufacturing method includes: a bare optical fiber forming step of forming a bare optical fiber by melting and deforming an optical fiber preform; cooling the bare optical fiber after the bare optical fiber forming step by passing the bare optical fiber through a flow channel of a cooling unit through which cooling gas flows; and a protective coating layer forming step of forming a protective coating layer by supplying a molten resin to a periphery of the bare optical fiber after the cooling step thereby forming an optical fiber. The cooling gas flowing toward a vertically lower end of the flow channel is blocked by the molten resin used to form the protective coating layer, and carbon dioxide gas is supplied toward the flow channel from a position which is vertically below the supply position of the cooling gas and vertically above the blocking position of the molten resin.

(2) The flow rate of at least one of the cooling gas and the carbon dioxide gas may be adjusted in the cooling step.

(3) The carbon dioxide gas with a predetermined flow rate may be further supplied into the flow channel from a position vertically above the supply position of the cooling gas.

(4) Helium gas may be employed as the cooling gas.

(5) In (4), when a minimum flow rate of the helium gas for obtaining a predetermined cooling ability is assumed to be X L/min, in the cooling step, the supply flow rate of the helium gas may be set to be equal to or higher than 1.2X L/min and equal to or less than 3.0X L/min, and a flow ratio obtained by dividing the supply flow rate of the carbon dioxide gas by the supply flow rate of the helium gas may be set to be equal to or higher than 0.05 at the upper limit of a drawing speed in a stability range of a drawing condition and equal to or less than 1.0 at the lower limit of the drawing speed.

(6) An exemplary embodiment of an optical fiber manufacturing apparatus of the invention includes: a heating furnace for forming a bare optical fiber by melting and deforming an optical fiber preform; a cooling unit having a flow channel through which the bare optical fiber is inserted and cooling gas flows, and a cooling gas inlet port for introducing the cooling gas into the flow channel; a coating unit for forming a protective coating layer by supplying a molten resin to the bare optical fiber which has passed through the cooling unit; a curing unit for curing the protective coating layer; a connecting unit for connecting the cooling unit to the coating unit; and a first carbon dioxide gas inlet port which is disposed at a position between the cooling unit and the coating unit and vertically below the cooling gas inlet port, and from which carbon dioxide gas is introduced toward the flow channel, wherein the flows of the cooling gas and the carbon dioxide gas flowing toward the coating unit are blocked by the molten resin inside the coating unit, and an outlet port is provided at the upper end of the cooling unit for discharging the cooling gas and the carbon dioxide gas.

(7) An adjusting mechanism for adjusting the flow rate of at least one of the cooling gas and the carbon dioxide gas may further be included.

(8) The cooling unit may include a second carbon dioxide gas inlet port which is disposed at a position vertically above the cooling gas inlet port, and from which carbon dioxide gas with a predetermined flow rate is supplied into the flow channel.

(9) Helium gas may be employed as the cooling gas.

(10) In (9), when a minimum flow rate of the helium gas for obtaining a predetermined cooling ability is assumed to be X L/min, the supply flow rate of the helium gas may be set to be equal to or higher than 1.2X L/min and equal to or less than 3.0X L/min, and a flow ratio obtained by dividing the supply flow rate of the carbon dioxide gas by the supply flow rate of the helium gas is set to be equal to or higher than 0.05 at the upper limit of a drawing speed in a stability range of a drawing condition and equal to or less than 1.0 at the lower limit of the drawing speed.

In the optical fiber manufacturing method according to (1) and the optical fiber manufacturing apparatus according to (6), the cooling gas and the carbon dioxide gas flow vertically upwards inside the flow channel to be discharged from the upper end of the flow channel to the outside. Specifically, since both the cooling gas and the carbon dioxide gas flow vertically upwards, the density of the cooling gas inside the flow channel can be increased as compared with a conventional method in which the cooling gas spreads upwards and downwards. As a result, it is possible to significantly reduce the flow rate of the cooling gas for obtaining a desired cooling ability between 5% and 50% of the conventional flow rate.

In addition, since both the cooling gas and the carbon dioxide gas flow upwards, the flows of the gases inside the flow channel can be stable.

In addition, the carbon dioxide gas is introduced from a position below the supply position of the cooling gas. Accordingly, in the vicinity of a position where the bare optical fiber is coated with the molten resin of which is positioned near the inlet port of the carbon dioxide gas, a sufficient amount of carbon dioxide gas exists. Therefore, the incorporation of bubbles from the cooling gas into the protective coating layer can be prevented.

In addition, by adjusting the flow rate of at least one of the cooling gas and the carbon dioxide gas, the cooling ability in a stability range of a drawing condition can be adjusted with good response characteristics.

In addition, when the helium gas is employed as the cooling gas, by suitably setting the supply flow rate of the helium gas and setting a flow ratio between the helium gas and the carbon dioxide gas to be in a suitable range, the cooling ability can be adjusted with good response characteristics.

In addition, since the cooling ability is adjusted with high response characteristics and the thickness of the protective coating layer can be maintained at a constant level, lateral pressure characteristics are good. Therefore, the optical fiber having the protective coating layer of which the thickness is hardly changed in a lengthwise direction of the optical fiber can be obtained.

In addition, when the helium gas is employed as the cooling gas, the flow rate of the helium gas can be significantly reduced. Therefore, manufacturing costs can be reduced, and the optical fiber can be manufactured at low cost.

DETAILED DESCRIPTION OF THE INVENTION

Figure 1:
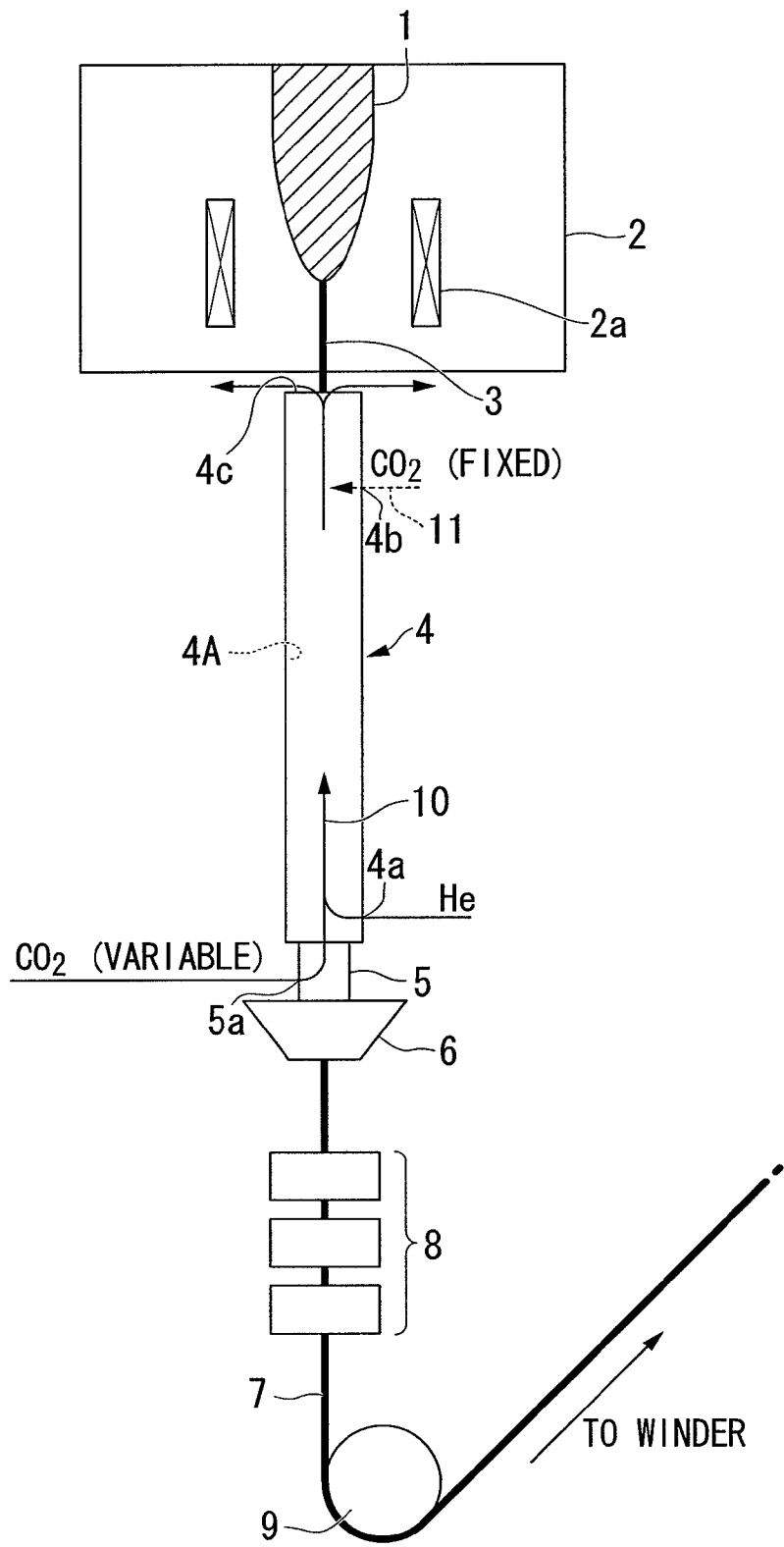
FIG. 1 is a schematic view illustrating an optical fiber manufacturing apparatus according to an exemplary embodiment of the invention.

Hereinafter, an exemplary embodiment of an optical fiber manufacturing apparatus and an exemplary optical fiber manufacturing method will be described with reference to the accompanying drawings. FIG. 1 is a schematic view illustrating a configuration of the optical fiber manufacturing apparatus according to an exemplary embodiment of the invention.

The optical fiber manufacturing apparatus of FIG. 1 includes a heating furnace 2, a cooling unit 4, a coating unit 6, a connecting unit 5 for connecting the cooling unit 4 to the coating unit 6, a curing unit 8, and a turn pulley 9.

Using the optical fiber manufacturing apparatus, an optical fiber is manufactured through the steps as follows. First, a bare optical fiber 3 is formed by melting and deforming an optical fiber preform 1 in the heating furnace 2, and the bare optical fiber 3 is pulled out from the heating furnace 2. Next, the cooling unit 4, which is provided vertically below the heating furnace 2 and not connected to the heating furnace 2, continually cools the bare optical fiber 3. Next, the coating unit 6 which is disposed vertically below the cooling unit 4 applies a molten resin to the cooled bare optical fiber 3 to be coated with a protective coating layer (not shown). Next, the curing unit 8 which is provided vertically below the coating unit 6 allows the protective coating layer to cure, thereby forming an optical fiber 7. The optical fiber 7 obtained as described above is wound through the turn pulley 9 by a winder not shown.

The cooling unit 4 and the coating unit 6 are connected with the connecting unit 5 interposed therebetween. Note that the cooling unit 4 is formed as a cylinder with an axis in a vertical direction and has a flow channel 4A formed inside through which cooling gas flows and into which the bare optical fiber 3 is inserted. In addition, at the upper end of the cooling unit 4, an outlet port 4c, which is connected to the flow channel 4A to discharge the cooling gas and carbon dioxide gas (described later) is provided.

At an upper portion of the cooling unit 4, a second carbon dioxide gas inlet port 4b, for introducing a predetermined flow rate of the carbon dioxide gas into the flow channel 4A, may be provided. In this case, by suitably adjusting the flow rate of the carbon dioxide gas introduced from the second carbon dioxide gas inlet port 4b, the cooling ability of the upper portion (that is, a portion above the second carbon dioxide gas inlet port 4b) of the cooling unit 4 can be adjusted with good precision.

Figure 2:
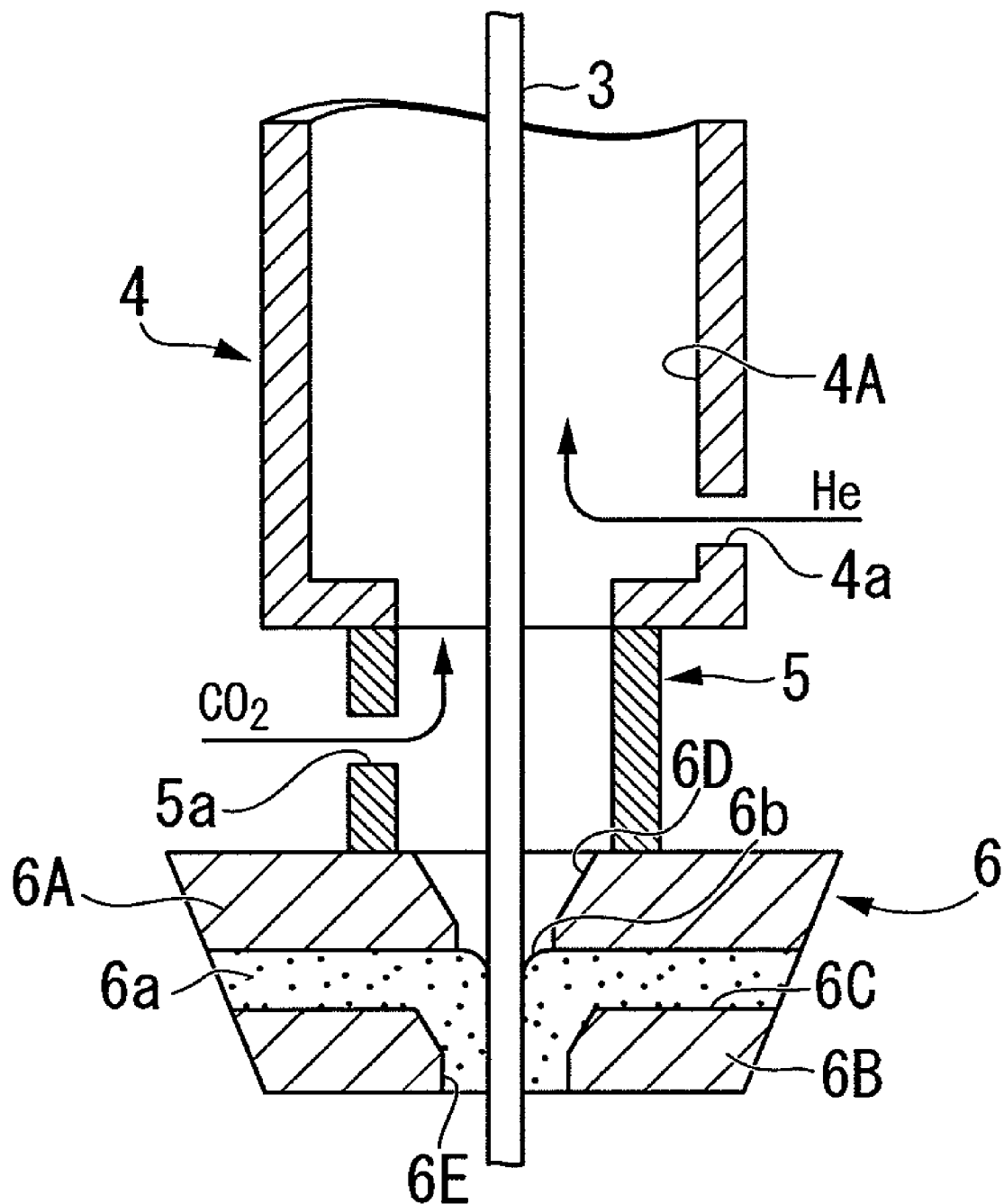
FIG. 2 is a partial sectional view of a cooling unit, a connecting unit, and a coating unit of an exemplary optical fiber manufacturing apparatus.

FIG. 2 is a partial sectional view of the cooling unit 4, the connecting unit 5, and the coating unit 6.

At a side surface of a lower portion of the cooling unit 4, an inlet port 4a of, for example helium gas, the cooling gas is formed, and at a side surface of the connecting unit 5, an inlet port 5a of the carbon dioxide gas is formed. The inlet ports 4a and 5a are connected to the flow channel 4A. The flow rate of the helium gas introduced into the flow channel 4A from the inlet port 4a is maintained at a constant level by a flow control mechanism (not shown). In addition, the flow rate of the carbon dioxide gas introduced into the flow channel 4A from the carbon dioxide gas inlet port 5a is set to be freely changed by another flow control mechanism (not shown).

The coating unit 6 includes a nipple 6A provided on the side of the connecting unit 5 and a die 6B provided vertically below the nipple 6A. Between the nipple 6A and the die 6B, a resin introduction path 6C extending from the side surface of the coating unit 6 to the center portion is formed. Through the resin introduction path 6C, a coating resin 6a as the molten resin is supplied. At the center portion of the nipple 6A, an inverted-cone trapezoidal inlet hole 6D is formed. At the center portion of the die 6B, a through-hole 6E is formed. The coating resin 6a, introduced through the resin introduction path 6C, passes through the through-hole 6E. The bare optical fiber 3 is drawn into the inlet hole 6D and pulled out through the through-hole 6E. Accordingly, the bare optical fiber 3 is coated with the coating resin 6a on the surface, thereby forming the protective coating layer with a predetermined thickness.

In addition, when the bare optical fiber 3 passes through the coating resin 6a, the coating resin 6a is adhered to the surface of the bare optical fiber 3. Accordingly, the coating resin 6a is pulled along the bare optical fiber 3 a little. As a result, at the top surface of the coating resin 6a, a meniscus 6b formed as a downward curved surface occurs.

The cooling unit 4 and the coating unit 6 are connected with the cylindrical connecting unit 5 interposed therebetween. An upper portion of the internal space of the inlet hole 6D of the coating unit 6 is connected to the internal space of the connecting unit 5, and a lower portion thereof is closed by the bare optical fiber 3 and the meniscus 6b of the coating resin 6a. Therefore, the helium gas introduced from the inlet port 4a and the carbon dioxide gas introduced from the inlet port 5a, except for portions of the gases flowing along with the bare optical fiber 3, are blocked, and therefore do not flow downwards but flow upwards continually. Specifically, as shown by a flow 10 in FIG. 1, the helium gas and the carbon dioxide gas flow upwards vertically. In the embodiment, at the upper end of the cooling unit 4, the outlet port 4c is formed, and the gases are discharged to the outside from the outlet port 4c.

Although the gases are discharged to the outside, since the cooling unit 4 is not connected to the heating furnace 2, the gases have no influence on the heating furnace 2 at all. As a result, there is no change of the gas condition in the heating furnace 2, and so it is possible to perform stable drawing without influencing optical characteristics such the fiber diameter and due loss of the optical fiber.

With such, all exemplary configurations described above, although the flow of the gases may be disturbed by various factors, the gases except for generally insubstantial portions, flow upwards vertically. Accordingly, the flow of the gases does not become unstable, and a stable cooling ability can be obtained.

Moreover, since the gases flow upward and are discharged from the outlet port 4c provided at the upper end of the cooling unit 4, the penetration of external gas into the flow channel 4A from the upper end of the cooling unit 4, resulting in the incorporation of the external gas into the helium gas and carbon dioxide gas, can be minimized. Therefore, the density of helium in the cooling unit 4 can be maximized, and the amount of helium gas required can be significantly reduced.

In this exemplary embodiment, in addition to the helium gas, the carbon dioxide gas, separately provided flows into the flow channel 4A of the cooling unit 4. In this embodiment, the inlet port 4a is provided at the lower end of the cooling unit 4. However, the inlet port 4a may alternatively be provided at an upper portion of the connecting unit 5. In addition, in this embodiment, the carbon dioxide gas inlet port 5a is provided at a lower portion of the connecting unit 5. However, the inlet port 5a may alternatively be provided at other positions, such as an upper portion of the coating unit 6, as long as the position is below the inlet port 4a. More specifically, the inlet port 4a should be provided at a downstream side of the upward flow of the gas, and the carbon dioxide gas inlet port 5a should be provided at an upstream side of the upward flow of the gas, with respect to each other.

In this embodiment, the gas flow moves upwards, and each gas stably flows. Therefore, if helium gas is used as the cooling gas as in this embodiment, the density of the carbon dioxide gas, which is heavier than the helium gas is highest in the vicinity of the coating unit 6, so that the incorporation of bubbles of helium gas into the protective coating layer and the remaining bubbles in the protective coating layer can be prevented.

Moreover, as the flows of the helium gas and the carbon dioxide gas become stable, a mixing ratio between the helium gas and the carbon dioxide gas in the flow channel 4A of the cooling unit 4 becomes stable. As a result, since the cooling ability becomes stable, a stability range of the drawing condition can be set to be wide and proper cooling and coating operations can be performed.

In addition, in this embodiment, the flow rate of the carbon dioxide gas introduced from the carbon dioxide gas inlet port 5a is adjusted by the flow control mechanism, thereby adjusting a cooling efficiency (cooling ability) of the cooling unit 4.

Accordingly, without using sealing gas as disclosed in Japanese Unexamined Patent Application, First Publication No. 2003-95689, the cooling ability of the cooling unit 4 can be adjusted by using only the helium gas and the carbon dioxide gas, so that the cooling ability can be stable.

The adjustment of the cooling ability may be performed by adjusting the flow rate of the helium gas. Moreover, the adjustment of the cooling ability may also be performed by adjusting the flow rates of both of the helium gas and the carbon dioxide gas.

The adjustment of the flow rate of the helium gas or the carbon dioxide gas may be controlled on the basis of a coating diameter signal or the drawing speed.

In addition, mixed gas in the mixing zone (that is, a mixed gas zone where the carbon dioxide gas, that is supplied from the inlet port 5a and flows upwards, and the helium gas, which is supplied from the inlet port 4a and pulled along with the optical fiber to flow downwards, are mixed with each other) between the carbon dioxide gas inlet port 5a and the inlet port 4a, flows upwards. Therefore, the mixed gas flows toward the cooling unit 4 and is finally discharged from the outlet port 4c provided at the upper end of the cooling unit 4, so that an unstableness of the mixing ratio can be prevented. Accordingly, the cooling ability can be easily adjusted, thereby improving the response characteristics in the adjustment of the cooling ability.

Consequently, it is possible to control the cooling ability and maintain the thickness of the protective coating layer at a constant level with good response characteristics according to the change in the drawing speed.

Generally, in the drawing of optical fibers, a stability range (a manufacturing condition range for stably manufacturing products having satisfactory characteristics) of the drawing condition in a predetermined speed range having a center drawing speed as the center value is determined. The drawing speed significantly influences the cooling temperature of the optical fiber and the thickness (coating diameter) of the protective coating layer upon coating. Accordingly, if the cooling ability can be controlled with good response characteristics over a wide range of drawing speeds, so as to maintain the coating diameter at a constant level and prevent the incorporation of bubbles into the protective coating layer, it is possible to widen the stability range of the drawing condition.

When the optical fiber is manufactured by satisfying the stability range of the drawing condition, the incorporation of the carbon dioxide gas around the meniscus 6b of the coating unit 6 into the protective coating layer, resulting in generation of bubbles, can be prevented even in the state where a flow ratio, obtained by dividing the supply flow rate of the carbon dioxide gas by the supply flow rate of the helium gas, supplied is small (generally, in the state where the drawing speed is at the upper limit, for example). Therefore, the cooling ability can be adjusted with good precision, and the amount of the helium gas can be minimized.

Exemplary Experiments

As a preliminary experiment, an experiment on control of the supply flow rate of the carbon dioxide gas and the supply flow rate of the helium gas was performed by using the optical fiber manufacturing apparatus illustrated in FIG. 1. Helium gas was supplied at a position 30 centimeters (cm) higher than the coating unit 6=, and carbon dioxide gas was supplied at a position 2 cm higher than the coating unit 6. As the coating resin, a urethane acrylate-based resin was used, and the drawing speed was set to 2000 meters/minute (m/min).

Figure 3:
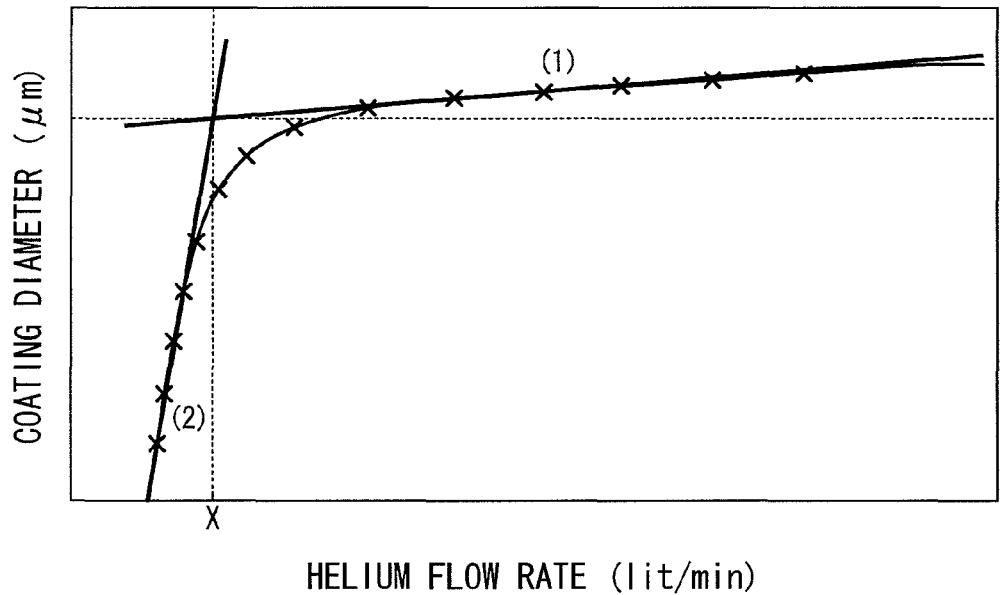
FIG. 3 is a graph showing a relationship between the flow rate of helium gas as a cooling gas and a coating diameter according to an exemplary embodiment of the invention.

FIG. 3 is a graph showing a relationship between the supply flow rate of the helium gas, in the case where the supply flow rate of the carbon dioxide gas is set to 0 liters/minute (L/min) (that is, in the case where the carbon dioxide gas is not supplied), and the coating diameter. As described above, since the coating diameter is changed depending on the temperature of the bare optical fiber 3 cooled by the cooling unit 4, a relationship between the supply flow rate of the helium gas and the cooling ability can be seen from the graph. The graph shown in FIG. 3 is divided into an area (1) where a change in the coating diameter with respect to a change in the supply flow rate of the helium gas is small and an area (2) where the change in the coating diameter is great. In addition, approximate lines for the two areas are obtained, and the flow rate of the helium gas at an intersection of the two approximate lines is assumed to be X L/min.

As shown in FIG. 3, when the supply flow rate of the helium gas is higher than X L/min, the change in the coating diameter is not that great even though the supply flow rate of the helium gas is changed, and the cooling ability can be maintained. However, when the supply flow rate of the helium gas is lower than X L/min, the change in the coating diameter with respect to the change in the supply flow rate of the helium gas is great, and the cooling ability significantly decreases. The flow rate of X L/min is set as the minimum flow rate of the helium gas for obtaining a predetermined cooling ability.

Figure 4:
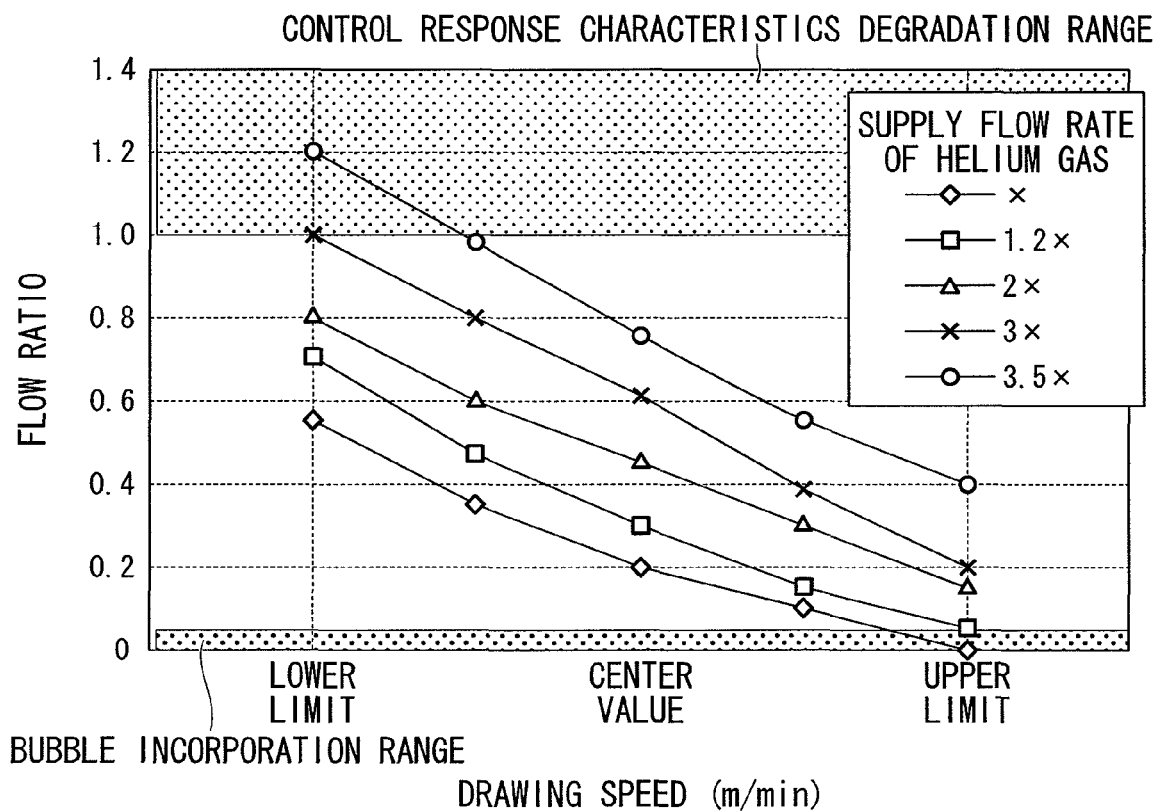
FIG. 4 is a graph showing a relationship between a drawing speed and a flow ratio according to an exemplary embodiment of the invention.
Figure 5:
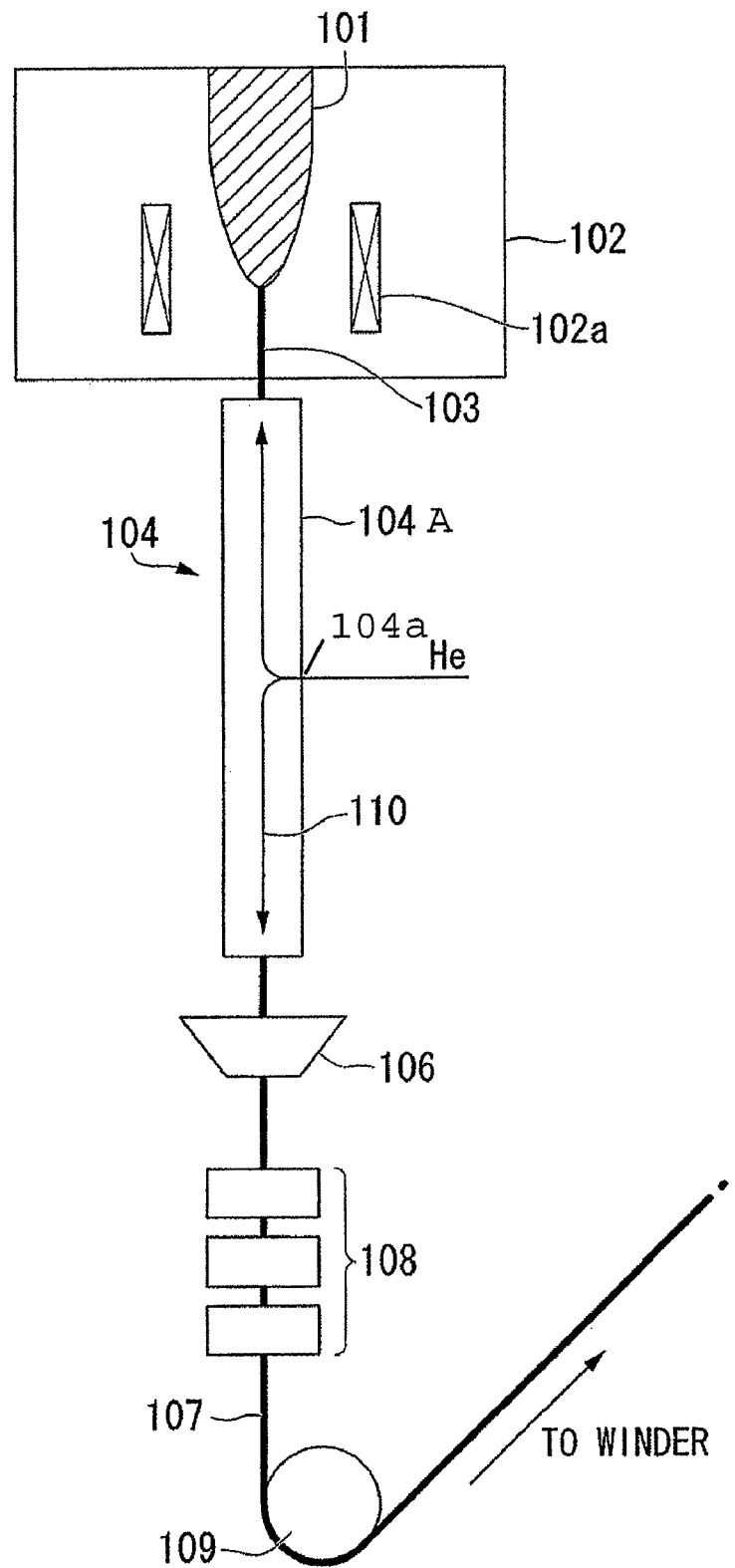
FIG. 5 is a schematic view illustrating a conventional optical fiber manufacturing apparatus.
Figure 6:
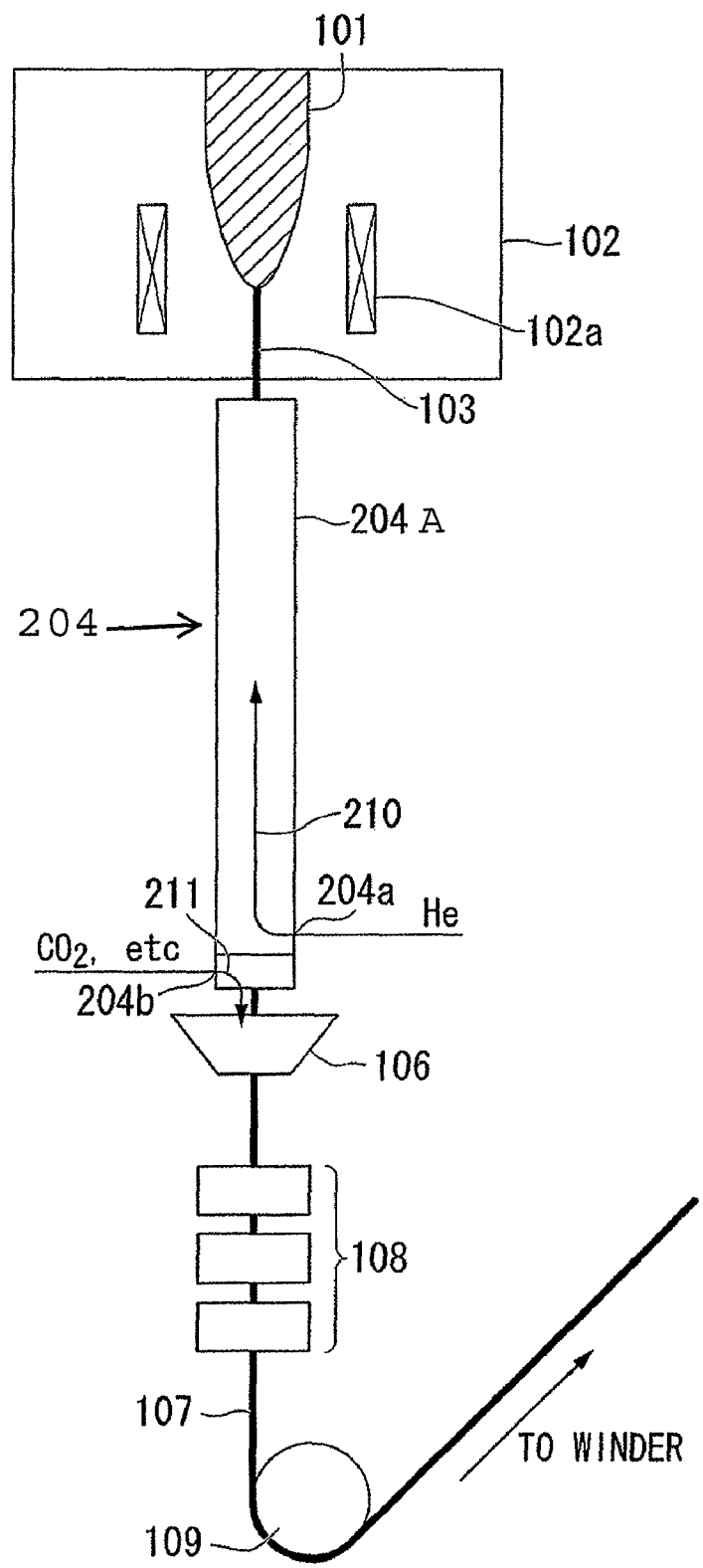
FIG. 6 is a schematic view illustrating another conventional optical fiber manufacturing apparatus.

FIG. 4 is a graph showing a relationship between the drawing speed and the flow ratio in the stability range of the drawing condition. Table 1 shows flow ratios, determination results of bubble incorporation, and determination results of response characteristics. Note that, the response characteristics are determined depending on whether or not the coating diameter can be maintained at a constant level with respect to the change in the drawing speed. Specifically, when the coating diameter is changed with respect to the change in the drawing speed, poor response characteristics are determined. In contrast, when the coating diameter is not changed with respect to the change in the drawing speed, good response characteristics are determined.

TABLE 1

| Flow ratio | Bubble incorporation | Response characteristics |
|---|---|---|
| 0.03 | Yes | Good |
| 0.05 | No | Good |
| 0.1 | No | Good |
| 0.3 | No | Good |
| 0.5 | No | Good |
| 0.8 | No | Good |
| 1.0 | No | Good |
| 1.1 | No | Poor |
| 1.5 | No | Poor |

Here, when the flow rate of the helium gas is lower than 1.2X L/min, at the upper limit of the drawing speed in the stability range of the drawing condition, the flow ratio is low or 0 (that is, the flow rate of the carbon dioxide gas is low or 0). In this case, bubble incorporation is likely. When the flow rate of the helium gas is higher than 3.0X L/min, the flow ratio increases. Particularly, at the lower limit of the drawing speed in the stability range of the drawing condition, the flow rate of the carbon dioxide gas increases, so that response characteristics of the cooling ability is degraded. In addition, at the upper limit of the drawing speed in the stability range of the drawing condition, the amount of the carbon dioxide gas increases, so that the amount of the helium gas also increases.

From above, when an optical fiber is manufactured by using the optical fiber manufacturing apparatus of FIG. 1, it is preferable that when the minimum flow rate of the helium gas for obtaining a predetermined cooling ability (in the state where the flow rate of the carbon dioxide gas is set to be 0: that is, in the state where the cooling ability is maximum) is assumed to be X L/min, the supply flow rate of the helium gas is set to be equal to or higher than 1.2X L/min and equal to or less than 3.0X L/min. The flow ratio is set to be equal to or higher than 0.05 at the upper limit of the drawing speed in the stability range of the drawing condition and equal to or less than 1.0 at the lower limit of the drawing speed, in terms of the bubble incorporation, the response characteristics, and the amount of the helium gas.

Example 1

An optical fiber was manufactured by using the optical fiber manufacturing apparatus illustrated in FIG. 1 at a center drawing speed of 1950 m/min. The heating furnace and the cooling unit were not connected to each other. The cooling unit and the coating unit were connected with the connecting unit. Helium gas was supplied from a vertically lower portion of the cooling unit, and carbon dioxide gas was supplied from an upper portion of the coating unit (or a lower portion of the connecting unit). The flow rate of the carbon dioxide gas was set to be freely changed. The drawing speed was set to 2100 m/min, which is the upper limit in the stability range of the drawing condition, the flow rate of the carbon dioxide gas was set to 0, and the minimum flow rate X of the helium gas for obtaining a predetermined cooling ability was checked. The result was 1 L/min. Note that, in this case, the incorporation of bubbles was not considered as a problem. Accordingly, the carbon dioxide gas was added to the helium gas having a supply flow rate of 1.2 L/min. In order for a coating diameter to be 195 micrometers (μm) as a target, the carbon dioxide gas of 0.06 L/min was needed. Therefore, the flow ratio in this case is 0.05. In addition, the incorporation of bubbles into a protective coating layer could not be observed.

Moreover, when the drawing speed was set to 1800 m/min, which is the lower limit in the stability range of the drawing condition, in order for the coating diameter to be 195 μm as the target, the carbon dioxide gas of 1.2 L/min was needed. Therefore, the flow ratio in this case is 1.0. The incorporation of bubbles into the protective coating layer could not be observed. In this situation, in order to maintain the coating diameter at a constant level, the flow rate of the carbon dioxide gas was adjusted by feedback control to perform long-fiber drawing. In this case, in the drawing speed range of 1950 m/min±150 m/min, the coating diameter of 195 μm could be maintained, and the optical fiber could be stably manufactured without the incorporation of bubbles and with good control characteristics (response characteristics) with respect to the drawing speed.

Example 2

An optical fiber was manufactured by using the optical fiber manufacturing apparatus illustrated in FIG. 1 at a center drawing speed of 1200 m/min. The heating furnace and the cooling unit were not connected to each other. The cooling unit and the coating unit were connected with the connecting unit. Helium gas was supplied from a vertically lower portion of the cooling unit, and carbon dioxide gas was supplied from an upper portion of the coating unit (or a lower portion of the connecting unit). The flow rate of the carbon dioxide gas was set to be freely changed. The drawing speed was set to 1400 m/min, which is the upper limit in the stability range of the drawing condition, the flow rate of the carbon dioxide gas was set to 0 L/min, and the minimum flow rate X of the helium gas for obtaining a predetermined cooling ability was checked. The result was 0.8 L/min. Note that, in this case, the incorporation of bubbles was not considered as a problem. Accordingly, the carbon dioxide gas was added to the helium gas having a flow rate of 1.5 L/min. In order for a coating diameter to be 195 μm as a target, the carbon dioxide gas of 0.08 L/min was needed. Therefore, the flow ratio in this case is 0.05. In addition, the incorporation of bubbles into a protective coating layer could not be observed.

Moreover, when the drawing speed was set to 1000 m/min, which is the lower limit in the stability range of the drawing condition, in order for the coating diameter to be 195 μm as the target, the carbon dioxide gas of 1.4 L/min was needed. Therefore, the flow ratio in this case is 0.93. The incorporation of bubbles into the protective coating layer could not be observed. In this situation, in order to maintain the coating diameter at a constant level, the flow rate of the carbon dioxide gas was adjusted by feedback control to perform long-fiber drawing. In this case, in the drawing speed range of 1200 m/min±200 m/min, the coating diameter of 195 μm could be maintained, and the optical fiber could be stably manufactured without the incorporation of bubbles and with good control characteristics (response characteristics) with respect to the drawing speed.

Comparative Example 1

An optical fiber was manufactured at a center drawing speed of 1950 m/min, by using an apparatus in which a heating furnace and a cooling unit are not connected, the cooling unit and a coating unit are not connected, helium gas is supplied from a vertically lower portion of the cooling unit, and carbon dioxide gas is supplied from an upper portion of an extending unit mounted to the lower portion of the cooling unit. A drawing speed was set to 1950 m/min, which was the center value in a stability range of the drawing condition, the flow rate of the carbon dioxide gas was set to 1 L/min and 5 L/min to check the flow rate of the helium gas for maintaining a cooling ability. As a result, in the case where the flow rate of the carbon dioxide gas was 1 L/min, a bare optical fiber could not be cooled enough even when the flow rate of the helium gas was 30 L/min. In addition, in the case where the flow rate of the carbon dioxide gas was 5 L/min, a coating diameter could be 195 μm when the flow rate of the helium gas was 25 L/min. However, response characteristics for a change in the drawing speed were poor, and performing stable product manufacturing was difficult.

Example 3

An optical fiber was manufactured by using the optical fiber manufacturing apparatus illustrated in FIG. 1 at a center drawing speed of 2500 m/min. The heating furnace and the cooling unit were not connected to each other. The cooling unit and the coating unit were connected with the connecting unit. Helium gas was supplied from a vertically lower portion of the cooling unit, and carbon dioxide gas was supplied from an upper portion of the coating unit (or a lower portion of the connecting unit). The flow rate of the carbon dioxide gas was set to be freely changed. The drawing speed was set to 2600 m/min, which is the upper limit in the stability range of the drawing condition, the flow rate of the carbon dioxide gas was set to 0 L/min, and the minimum flow rate X of the helium gas for obtaining a predetermined cooling ability was checked. The result was 2 L/min. Note that, in this case, the incorporation of bubbles was not considered as a problem. Accordingly, the carbon dioxide gas was added to the helium gas having a flow rate of 6 L/min. In order for a coating diameter to be 195 μm as a target, the carbon dioxide gas of 0.9 L/min was needed. Therefore, the flow ratio in this case is 0.15. In addition, the incorporation of bubbles into a protective coating layer could not be observed.

Moreover, when the drawing speed was set to 2400 m/min, which is the lower limit in the stability range of the drawing condition, in order for the coating diameter to be 195 μm as the target, the carbon dioxide gas of 5.5 L/min was needed. Therefore, the flow ratio in this case is 0.92. The incorporation of bubbles into the protective coating layer could not be observed. In this situation, in order to maintain the coating diameter at a constant level, the flow rate of the carbon dioxide gas was adjusted by feedback control to perform long-fiber drawing. In this case, in the drawing speed range of 2500 m/min±100 m/min, and the coating diameter of 195 μm could be maintained, and the optical fiber could be stably manufactured without the incorporation of bubbles and with good control characteristics (response characteristics) with respect to the drawing speed.

Example 4

An optical fiber was manufactured by using the optical fiber manufacturing apparatus illustrated in FIG. 1 at a center drawing speed of 2500 m/min. The heating furnace and the cooling unit were not connected to each other. The cooling unit and the coating unit were connected with the connecting unit. Helium gas was supplied from a vertically lower portion of the cooling unit, and carbon dioxide gas was supplied from an upper portion of the coating unit (or a lower portion of the connecting unit). The flow rate of the carbon dioxide gas was set to be freely changed. In addition, a second carbon dioxide gas inlet port for introducing a fixed amount of carbon dioxide gas was provided at a position higher than an inlet port of the helium gas by 3 m. The drawing speed was set to 2600 m/min, which is the upper limit in the stability range of the drawing condition, the flow rate of the carbon dioxide gas was set to 0 L/min, and the minimum flow rate X of the helium gas for obtaining a predetermined cooling ability was checked. The result was 2 L/min. In addition, in this case, the incorporation of bubbles was not considered as a problem. Accordingly, by setting the flow rate of the helium gas to 7 L/min and the flow rate (constant) of the carbon dioxide gas flown from above an inlet port of the helium gas to 1.0 L/min, the carbon dioxide gas flown from below the inlet port of the helium gas was added thereto. In order for a coating diameter to be 195 μm as a target, the carbon dioxide gas (variable) flown from below the inlet port of the helium gas of 0.4 L/min was needed. Therefore, the flow ratio in this case is 0.057. In addition, the incorporation of bubbles into a protective coating layer could not be observed.

Moreover, when the drawing speed was set to 2400 m/min, which is the lower limit in the stability range of the drawing condition, in order for the coating diameter to be 195 μm as the target, the carbon dioxide gas of 6.5 L/min was needed. Therefore, the flow ratio in this case is 0.92. The incorporation of bubbles into the protective coating layer could not be observed. In this situation, in order to maintain the coating diameter at a constant level, the flow rate of the carbon dioxide gas was adjusted by feedback control to perform long-fiber drawing. In this case, in the drawing speed range of 2500 m/min±100 m/min, and the coating diameter of 195 μm could be maintained, and the optical fiber could be stably manufactured without the incorporation of bubbles and with good control characteristics (response characteristics) with respect to the drawing speed.

Comparative Example 2

An optical fiber was manufactured at a center drawing speed of 2500 m/min, by using an apparatus in which a heating furnace and a cooling unit are not connected, the cooling unit and a coating unit are connected with a connecting unit, helium gas is supplied from a vertically lower portion of the cooling unit, and carbon dioxide gas is supplied from an upper portion of the coating unit (or from a lower portion of the connecting unit). The flow rate of the carbon dioxide gas was set to be freely changed. A drawing speed was set to 2600 m/min, which is the upper limit in a stability range of the drawing condition, the flow rate of the carbon dioxide gas was set to 0 L/min, and the minimum flow rate X of the helium gas for obtaining a predetermined cooling ability was checked. The result was 2 L/min. Note that, in this case, the incorporation of bubbles was not considered as a problem. Then, a flow rate of the helium gas was set to 2.3 L/min and the carbon dioxide gas was added. In order for a coating diameter to be 195 μm as a target, the carbon dioxide gas of 0.09 L/min was needed. Therefore, the flow ratio in this case is 0.04. However, the incorporation of bubbles into a protective layer was observed.

Comparative Example 3

An optical fiber was manufactured at a center drawing speed of 2500 m/min, by using an apparatus in which a heating furnace and a cooling unit are not connected, the cooling unit and a coating unit are connected with a connecting unit, helium gas is supplied from a vertically lower portion of the cooling unit, and carbon dioxide gas is supplied from an upper portion of the coating unit (or from a lower portion of the connecting unit). The flow rate of the carbon dioxide gas was set to be freely changed. A drawing speed was set to 2600 m/min, which is the upper limit in a stability range of the drawing condition, the flow rate of the carbon dioxide gas was set to 0 L/min, and the minimum flow rate X of the helium gas for obtaining a predetermined cooling ability was checked. The result was 2 L/min. Note that, in this case, the incorporation of bubbles was not considered as a problem. Then, a flow rate of the helium gas was set to 7 L/min and the carbon dioxide gas was added. In order for a coating diameter to be 195 μm as a target, the carbon dioxide gas of 1.5 L/min was needed. Therefore, the flow ratio in this case is 0.21. In addition, the incorporation of bubbles into a protective layer could not be observed.

Moreover, when the drawing speed was set to 2400 m/min, which is the lower limit in the stability range of the drawing condition, in order for the coating diameter to be 195 μm as the target, the carbon dioxide gas of 7.5 L/min was needed. Therefore, the flow ratio in this case is 1.07. In addition, the incorporation of bubbles into the protective coating layer could not be observed. In this situation, in order to maintain the coating diameter at a constant level, the flow rate of the carbon dioxide gas was adjusted by feedback control to perform long-fiber drawing. In this case, in the drawing speed range of 2500 m/min±100 m/min, the coating diameter of 195 μm could not be maintained (at the time of change in the drawing speed occurred in the front end portion and rear end portion of a preform). Although there was no incorporation of bubbles, control characteristics (response characteristics) with respect to the drawing speed were poor.

While exemplary embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the above-mentioned description, and is only limited by the scope of the appended claims.

What is claimed is:

1. An optical fiber manufacturing method comprising:
    forming a bare optical fiber by melting and deforming an optical fiber preform;
    cooling the bare optical fiber after the bare optical fiber forming step by passing the bare optical fiber, in a passing direction, through a flow channel through which cooling gas flows in the passing direction; and
    forming a protective coating layer by supplying a molten resin to a periphery of the bare optical fiber after the cooling step, thereby forming an optical fiber,
    wherein the cooling gas flowing in the passing direction is blocked by the molten resin used to form the protective coating layer, and
    carbon dioxide gas is supplied toward the flow channel from a position downstream, in the passing direction, from a supply position of the cooling gas and upstream, in the passing direction, from a blocking position of the molten resin.

2. The optical fiber manufacturing method according to claim 1, further comprising:
    adjusting a flow rate of the cooling gas or the carbon dioxide gas while cooling the bare optical fiber.

3. The optical fiber manufacturing method according to claim 1, further comprising:
    supplying carbon dioxide gas into the flow channel with a predetermined flow rate from a position upstream, in the passing direction, from the supply position of the cooling gas.

4. The optical fiber manufacturing method according to claim 1, wherein the cooling gas is helium gas.

5. The optical fiber manufacturing method according to claim 4,
    wherein, a minimum flow rate of the helium gas for obtaining a predetermined cooling ability is X L/min,
    a supply flow rate of the helium gas is equal to or higher than 1.2×L/min and equal to or less than 3.0×L/min, and
    a flow ratio obtained by dividing a supply flow rate of the carbon dioxide gas by the supply flow rate of the helium gas is equal to or higher than 0.05 at the upper limit of a drawing speed stability range of a drawing condition and equal to or less than 1.0 at the lower limit of the drawing speed stability range.

6. The optical fiber manufacturing method of claim 1, further comprising controlling a flow rate of the cooling gas or carbon dioxide gas based on a coating diameter signal while a drawing speed remains constant.

7. The optical fiber manufacturing method of claim 1, further comprising controlling a flow rate of the cooling gas or carbon dioxide gas based on a drawing speed while a coating diameter remains constant.

8. The optical fiber manufacturing method of claim 1, further comprising controlling the flow rate of the carbon dioxide gas based on a feedback control.

* * * * *